(12) United States Patent
Okano et al.

(10) Patent No.: US 11,167,789 B2
(45) Date of Patent: Nov. 9, 2021

(54) STEERING SYSTEM FOR VEHICLE

(71) Applicant: Toyota Jidosha Kabushiki Kaisha, Toyota (JP)

(72) Inventors: Takahiro Okano, Chiryu (JP); Takafumi Sato, Obu (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 75 days.

(21) Appl. No.: 16/798,958

(22) Filed: Feb. 24, 2020

(65) Prior Publication Data

US 2020/0290669 A1  Sep. 17, 2020

(30) Foreign Application Priority Data

Mar. 12, 2019 (JP) .............................. JP2019-044667

(51) Int. Cl.
| | |
|---|---|
| B62D 5/04 | (2006.01) |
| B62D 6/04 | (2006.01) |
| B62D 6/02 | (2006.01) |
| B62D 15/02 | (2006.01) |

(52) U.S. Cl.
CPC ............. *B62D 5/0463* (2013.01); *B62D 6/02* (2013.01); *B62D 6/04* (2013.01); *B62D 15/021* (2013.01)

(58) Field of Classification Search
CPC ........ B62D 5/04; B62D 5/001; B62D 5/0421; B62D 6/00; B62D 6/002; B62D 6/04; B62D 6/006; B62D 15/021; H02P 23/12; B60W 2510/20

See application file for complete search history.

(56) References Cited

U.S. PATENT DOCUMENTS

| | | | | |
|---|---|---|---|---|
| 2009/0319114 A1* | 12/2009 | Takenaka | .............. | B60W 10/18 701/48 |
| 2018/0339725 A1* | 11/2018 | Kodera | ................ | B62D 5/0421 |
| 2020/0108857 A1* | 4/2020 | Tsubaki | ................... | B62D 6/00 |

FOREIGN PATENT DOCUMENTS

| | | |
|---|---|---|
| JP | 2018-183046 A | 11/2018 |
| JP | 2020-0142598 A | 9/2020 |

OTHER PUBLICATIONS

U.S. Appl. No. 16/784,891, filed Feb. 7, 2020; Inventors: Takahiro Okano et al.; Corresponds to JP2020-0142598A.

* cited by examiner

*Primary Examiner* — Tan Q Nguyen
(74) *Attorney, Agent, or Firm* — Dinsmore & Shohl LLP (57) ABSTRACT

A steering system for a vehicle according to an example in the present disclosure includes a steering mechanism, which is mechanically disconnected from the steering wheel, to cause a turning wheel to be turned by a turning motor, and a control device that provides a motor command value to the turning motor. The control device has a control system including a feed-forward model for converting a target turning angle to a feed-forward value of a motor command value, and a disturbance observer including a inverse model of a model of a steering motor. Transfer functions respectively describing the feed-forward model and the model of the disturbance observer include a variable coefficient. The control device changes the variable coefficient based on information about road reaction force.

6 Claims, 5 Drawing Sheets

STEERING SYSTEM FOR VEHICLE

CROSS-REFERENCE TO RELATED APPLICATION

The present application claims priority under 35 U.S.C. § 119 to Japanese Patent Application No. 2019-044667, filed Mar. 12, 2019. The contents of this application are incorporated herein by reference in their entirety.

BACKGROUND

Field

The present disclosure relates to a steering system for a vehicle of a steer-by-wire system.

Background Art

JP2018-183046A discloses, in the steering system for a vehicle of a steer-by-wire system, an example of controlling the steering motor by a control system using a disturbance observer. The disturbance observer disclosed herein estimates torque other than motor torque generated as disturbances, such as disturbance torque on the steering mechanism, road reaction torque, friction torque, and the like. The control system of JP2018-183046A, by correcting a target torque of a turning motor by a disturbance torque estimated by the disturbance observer, to compensate for the disturbance torque.

However, in this control system using the disturbance observer, deviation between a model of the disturbance observer and an actual control object expanded when the running environment conditions changed, and there was a possibility that the accuracy of the turning control would be impaired.

SUMMARY

The present disclosure has been made in view of the above problems, and an object of an example of the present disclosure is to provide steering system for a vehicle of a steer-by-wire system capable of ensuring the accuracy of the turning control with respect to changes in the running environmental conditions.

The steering system for a vehicle according to an example in the present disclosure includes a steering mechanism that is mechanically disconnected from the steering wheel to cause a turning wheel to be turned by a turning motor, and a control device that provides a motor command value to the turning motor. The control device has a control system including a feed-forward model for converting a target turning angle to a feed-forward value of a motor command value, and a disturbance observer including a inverse model of a model of a steering motor. Transfer functions respectively describing the feed-forward model and the model of the disturbance observer include a variable coefficient. The control device changes the variable coefficient based on information about road reaction force.

According to the above configuration, when a change occurs in the road reaction force due to a change in running environment conditions, the variable coefficient of the transfer functions respectively describing the feed-forward model and the model of disturbance observer is changed in accordance with the change in the road surface reaction force. By this, the expansion of the deviation between the model of the control system and the control object due to the change of the running environment conditions is suppressed.

When a disturbance calculated by the disturbance observer becomes a predetermined value or more, the control device may change the variable coefficient of the transfer functions based on the information about the road reaction force. In other words, the change of the variable coefficient of the transfer functions may be performed after the disturbance becomes a predetermined value or more. According to this, it is possible to suppress frequent change of the variable coefficient at the stage where the deviation between the model and the control object of the control system is small, to ensure the stability of the control.

The control device may limit change speed of the variable coefficient of the transfer functions to a predetermined upper limit value or less. By setting the limit to the change speed of the variable coefficient, it is possible to prevent a sudden change in vehicle behavior. When the change speed of the target turning angle is a predetermined value or less, the control device may increase maximum change speed of the variable coefficient in a range that does not exceed the upper limit value in accordance with the change speed of the target turning angle.

When the vehicle is at a standstill or when the lateral acceleration acting on the vehicle is in the saturation region, the stability is given priority over the responsiveness to the rudder control. In such a case, the control device, on stopping the change of the variable coefficient of the transfer function, may limit size of the disturbance to a predetermined upper limit value or less. Thus, it is possible to maintain the stability of the turning control. Further, the control device may increase, when the change speed of the target turning angle is the predetermined value or less, maximum value of the disturbance in a range that does not exceed the upper limit value in accordance with the change speed of the target turning angle.

According to the steering system for vehicle according to the example in the present disclosure, when a change occurs in the road reaction force due to the change in the running environment conditions, the variable coefficient of the transfer functions of the models of the control system is changed in accordance with a change in the road reaction force. Thus, since the expansion of the deviation between the model of the control system and the control object due to the change of the running environment conditions suppressed. Therefore, it is possible to ensure the accuracy of the turning control with respect to the change of the running environment conditions.

DESCRIPTION OF EMBODIMENTS

An embodiment of the present disclosure will be described with reference to drawings. However, when referring to the number of each element, quantity, quantity, range, etc. in the embodiments shown below, the present disclosure is not limited to the number mentioned, unless specifically indicated or clearly specified. Further, structures or the like described in the embodiments described below are not necessarily to the embodiments in the present disclosure, except particularly when explicitly indicated or clearly specified therein.

Figure 1:
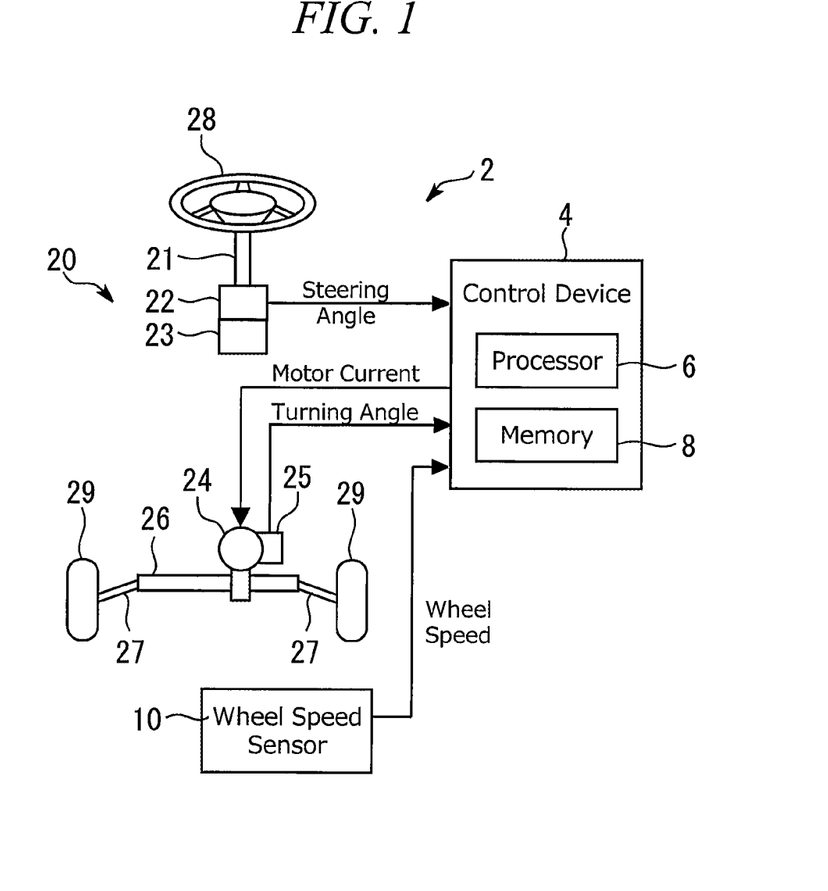
FIG. 1 is a diagram illustrating a configuration of a steering system for a vehicle according to an embodiment of the present disclosure.

FIG. 1 is a diagram illustrating a configuration of a vehicle steering system 2 for according to an embodiment in the present disclosure. The vehicle steering system 2 includes a steering mechanism 20. The steering mechanism 20 is a steering mechanism of a steer-by-wire system in which a turning wheel 29 can be turned by a turning motor 24 without being mechanically connected with a steering wheel 28. The steering wheel 28 is a steering member to which a steering operation by the driver is input. The steering wheel 28 is coupled to a reaction motor 23 via a steering shaft 21. The reaction motor 23 applies reaction force to the steering wheel 28 corresponding to the turning angle of the turning wheel 29. The steering shaft 21 is provided with a steering angle sensor 22 which outputs a signal corresponding to the rotation angle, that is, the steering angle, of the steering wheel 28.

The turning motor 24 is mounted to a rack shaft 26 via a reduction mechanism (not shown). The rack shaft 26 is not mechanically coupled to the steering shaft 21. The turning wheel 29 is coupled to the rack shaft 26 via a tie rod 27. Rotating the turning motor 24 causes the rack shaft 26 to move linearly in its axial direction, thereby changing the turning angle of the turning wheel 29 through the tie rod 27. The turning motor 24 is provided with a turning angle sensor 25 which outputs a signal corresponding to the turning angle of the turning wheel 29.

The vehicle steering system 2 includes a control device 4. The control device 4 is an ECU (Electronic Control Unit) having at least one processor 6 and at least one memory 8. The memory 8 stores various data including a map and various programs used for turning control. By the processor 6 reads and executes a program stored in the memory 8, various functions related to the turning control are realized in the control device 4.

The control device 4 controls motor current supplied to the turning motor 24, and thus controls torque for turning control applied from the turning motor 24 to the rack shaft 26. Various sensors for measuring physical quantities associated with the turning control are connected to the control device 4 directly or via a communication network constructed in the vehicle. Such sensors include at least a steering angle sensor 22, a turning angle sensor 25, and a wheel speed sensor 10.

Figure 2:
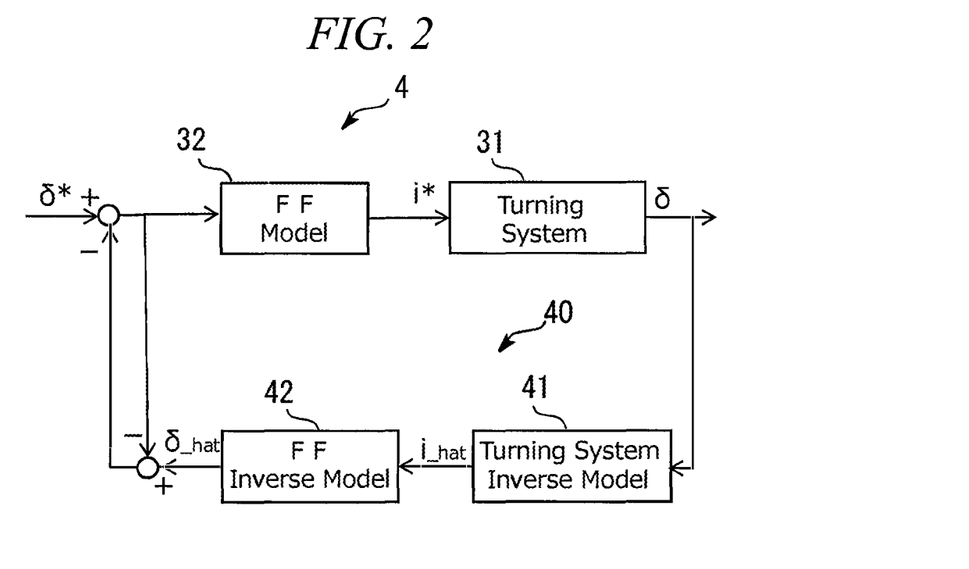
FIG. 2 is a block diagram illustrating a control system of a steering system for a vehicle according to the embodiment of the present disclosure.

FIG. 2 is a block diagram illustrating the control system of the vehicle steering system 2 according to this embodiment. The plant (controlled object) in this control system is a turning system 31 for turning the turning wheel 29 according to the target motor current determined by the control device 4. The turning system 31 includes a motor driver (not shown) that supplies the motor current to the turning motor 24 in accordance with the target motor current, the turning motor 24, a torque transmission mechanism that transmits the motor torque of the turning motor 24 to the rack shaft 26, and a turning wheel 29.

Figure 3:
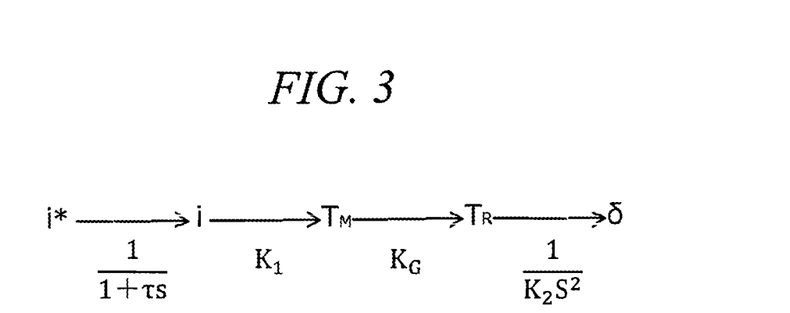
FIG. 3 is a model of the steering system.

The turning system 31 may be modeled as shown in FIG. 3. First, in the turning system 31, the motor current is output from the motor driver to the turning motor 24 in accordance with the target motor current. When the time constant of the control response of the motor current at that time is $\tau$, the relationship between the motor current i and the target motor current i* is expressed by the following equation. Incidentally, the extent constant $\tau$ of the control response is a fixed value, specifically a value of about 0.001 seconds.

$$i=(1/(1+\tau s))\times i^*$$

Next, in the turning system 31, the motor current is converted to the motor torque in the turning motor 24. When the motor torque coefficient is $K_1$, the relationship between the motor torque $T_M$ and the motor current i is expressed by the following equation. Incidentally, the motor torque coefficient $K_1$ is a fixed value, specifically a value of about 0.02~0.05 Nm/A.

$$T_M=K_1\times i$$

Next, in the turning system 31, the motor torque of the turning motor 24 is converted into the rack torque of the rack shaft 26 in a torque transmission mechanism from the turning motor 24 to the rack shaft 26. When the gear ratio at that time is $K_G$, the relationship between the rack torque $T_R$ and the motor torque $T_M$ is expressed by the following equation. Incidentally, the gear ratio $K_G$ is a fixed value, specifically a value of about 10 to 30.

$$T_R=K_G\times T_M$$

Next, in the turning system 31, the turning wheel 29 is turned by the rack torque of the rack shaft 26. The relationship between the rack torque and the turning angle of the turning wheel 29 depends on the road reaction force received by the turning wheel 29 from the road surface. Assuming that the road reaction force coefficient is $K_2$, the relationship between the turning angle $\delta$ and the rack torque $T_R$ is expressed by the following equation. The specific value of the road reaction force coefficient $K_2$ is such that, for example, when the turning angle $\delta$ is 30 degrees on a dry road surface and when the rack stroke is 80 mm, the rack torque $T_R$ is about 10000 Nm.

$$\delta=(1/(K_2\times s^2))\times T_R$$

As described above, a model of the turning system 31 can be expressed by the following transfer function.

$$\text{Turning System Model}:((K_1\times K_G)/(K_2\times s^2))\times(1/(1+\tau s))$$

Referring to FIG. 2, the control system of the vehicle steering device 2 according to the present embodiment will continue to be described. The control system consists of the turning system 31 capable of being modeled as described above, and the control device 4 having the control system including a feed-forward model 32 and a disturbance observer 40.

In the feed-forward model 32, the feed-forward value iff* of the target motor current i* is calculated from the target turning angle $\delta^*$. The feed-forward model 32 may be represented by, for example, the following transfer function when the turning system 31 is modeled as described above.

$$\text{Feed-forward Model}: K_1/(K_2\times K_G\times s^2)$$

The motor command value may not necessarily be a current. For example, the target value of the motor torque generated by the turning motor 24 may be a motor command value.

The disturbance observer 40 includes a turning system inverse model 41 and a feed-forward inverse model. The turning system inverse model 41 is an inverse model of the model of the turning system 31. In the turning system inverse model 41, estimated value i_hat of the motor current is calculated from the actual turning angle δ. The turning system inverse model 41 may be represented by the following transfer function when the turning system 31 is modeled as described above.

Turning System Inverse Model:$((K_2 \times s^2)) \times (1/(1+\tau s)/(K_1 \times K_G))$ The feed forward inverse model 42 is the inverse model of the feed-forward model 32. In the feed-forward inverse model 42, estimated value δ_hat of the target turning angle is calculated from the estimated value i_hat of the motor current. If the turning system 31 is modeled as described above, the feed-forward inverse model 42 may be represented by the following transfer function.

Feed-Forward Inverse Model:$(K_2 \times K_G \times s^2)/K_1$

In the control device 4, as a disturbance, the deviation amount (δ_hat−δ*), which is the difference between the estimated value δ_hat of the target turning angle calculated from the actual turning angle δ by the disturbance observer 40 and the target turning angle δ*, is subtracted from the target turning angle δ*. The value after subtraction is given to the feed-forward model 32 as the target turning angle δ* after the disturbance removal. However, it is not limited to the case of subtracting the deviation amount from the target turning angle δ*, but may be configured to remove the disturbance included in the target turning angle δ* by correcting the target turning angle δ* by the correction amount determined according to the disturbance (δ_hat−δ*).

As described above, the transfer function of each model of the control device 4 the feed-forward model 32, and the steering system inverse model 41, and the feed-forward inverse model 42) includes the road reaction force coefficient $K_2$. In these transfer functions, the road reaction force coefficient $K_2$ is treated not as a fixed value, but as a variable coefficient that can vary depending on the running environment conditions. The control device 4 changes the road reaction force coefficient $K_2$ based on information acquired by information acquisition device such as the wheel speed sensor 10 and the turning angle sensor 25. Information acquired by the information acquisition device is information on road reaction forces, including, for example, the vehicle speed, road surface friction coefficient, the turning angle, the operating state of ABS (Anti-Lock Brake System) and VSC (Vehicle Stability Control), and the like. Hereinafter, the setting of the road reaction force coefficient $K_2$ for each piece of information will be described in detail.

Figure 4:
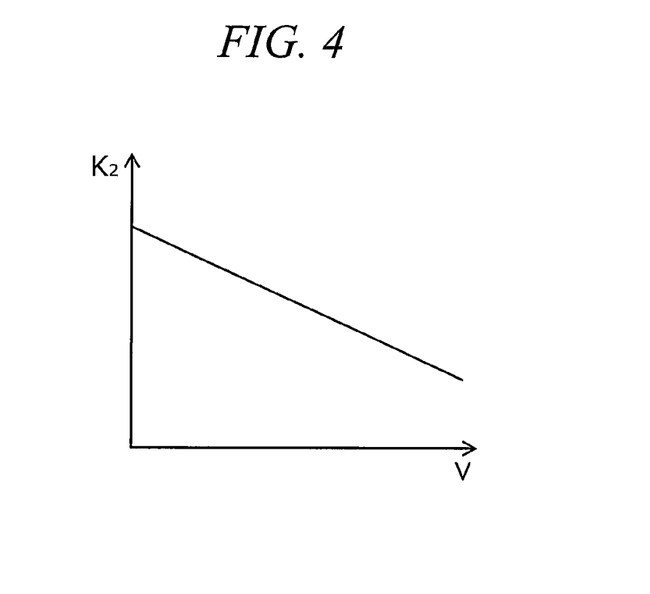
FIG. 4 is a diagram illustrating an example of setting of the road reaction force coefficient $K_2$.

FIG. 4 is a diagram illustrating an example of setting the road reaction force coefficient $K_2$ with respect to the vehicle speed V. The lower the vehicle speed, the greater the inertial of the turning wheel 29, and the turning wheel 29 is difficult to follow changes of the rack torque of the rack shaft 26. Therefore, as shown in FIG. 4, the control device 4, if the other conditions are identical, as the vehicle speed V is lower, sets the road reaction force coefficient $K_2$ to a larger value. In the present embodiment, the vehicle speed is measured using the signal of the wheel speed sensor 10.

Figure 5:
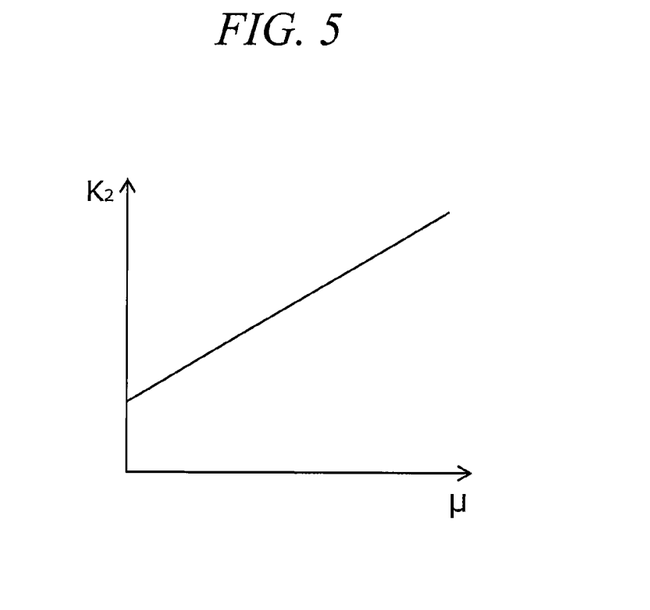
FIG. 5 is a diagram illustrating another example of setting of the road reaction force coefficient $K_2$.

FIG. 5 is a diagram illustrating an example of setting the road reaction force coefficient $K_2$ with respect to the road surface friction coefficient μ. The lower the road surface friction coefficient, the turning wheel 29 becomes slippery, the turning wheel 29 is easy to follow the changes of the rack torque of the rack shaft 26. Therefore, as shown in FIG. 5, the control device 4, if the other conditions are identical, sets the road reaction force coefficient $K_2$ to a smaller value as the road surface friction coefficient μ is lower. It is necessary to estimate the road surface friction coefficient because it cannot be directly measured, but the estimation method is not limited. For example, the road surface friction coefficient may be estimated based on the information about the road surface conditions acquired by a navigation system. Also, the road surface friction coefficient may be estimated based on the sensor information acquired by the vehicle sensor such as the wheel speed sensor 10.

Figure 6:
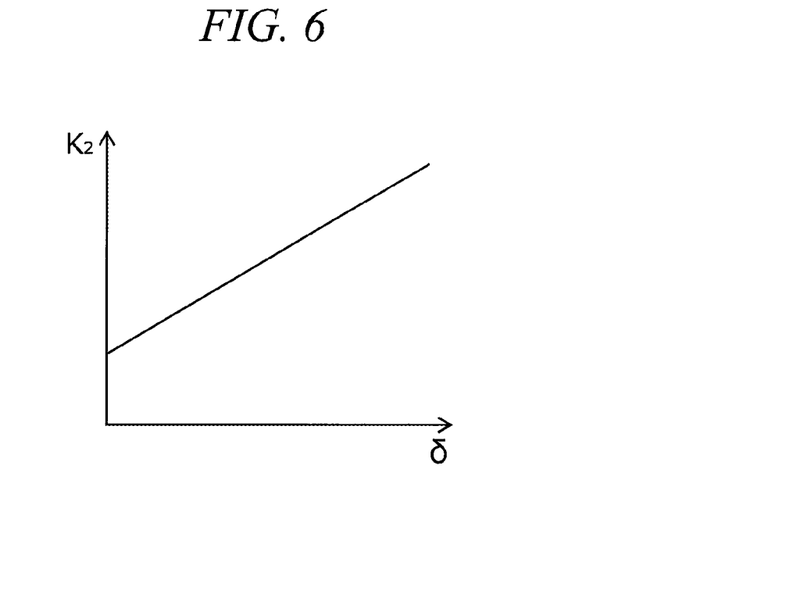
FIG. 6 is a diagram illustrating another example of setting of the road reaction force coefficient $K_2$.

FIG. 6 is a diagram illustrating an example of setting the road reaction force coefficient $K_2$ with respect to the turning angle δ. Since torsional force acting on the turning wheel 29 increases as the turning angle δ increases, the turning wheel 29 is difficult to follow the changes of the rack torque or the rack shaft 26. Therefore, as shown in FIG. 6, the control device 4, if the other conditions are identical, sets the road reaction force coefficient $K_2$ to a larger value as the turning angle δ is larger. In the present embodiment, the turning angle δ is measured using the signal of the turning angle sensor 25.

Further, the control device 4, when ABS or VSC is operating, changes the road reaction force coefficient $K_2$ to a smaller value than a value set when ABS or VSC is not operating. Information on the operating state of ABS or VSC is provided from a control device (not shown) of ABS or a control device (not shown) of VSC to the control device 4.

As described above, the control device 4 changes the road reaction force coefficient $K_2$ in accordance with a plurality of parameters relating to the road reaction force. As a specific method of changing the road reaction coefficient $K_2$ according to each parameter, for example, a map may be used. In other words, a map relating the road reaction coefficient $K_2$ to each parameter may be stored in the memory 8, and the road reaction coefficient $K_2$ may be determined by referring to the map. Also, a road reaction force coefficient $K_{2V}$ corresponding to the vehicle speed V, a road reaction force coefficient $K_2\mu$ corresponding, to the road surface friction coefficient μ, a road reaction force coefficient $K_{2\delta}$ corresponding to the turning angle δ, a road reaction force coefficient $K_{2ABS}$ corresponding to operating state of ABS, a road reaction force coefficient $K_{2VSC}$ corresponding to operating state VSC, and the like may be set, respectively, and the road reaction force coefficient $K_2$ may be calculated by the following equation.

$$K_2 = K_{2V} \times K_{2\mu} \times K_{2\delta} \times K_{2ABS} \times K_{2VSC}$$

According to the control system described above, when a change occurs in the road reaction force due to a change in the running environment conditions, the road reaction coefficient $K_2$ of the transfer function describing the models of the control system is changed in accordance with a change in the road reaction force. The change of the road reaction force coefficient $K_2$ is made so as to reduce the difference between the target turning angle δ* and the actual turning angle δ. Accordingly, since the expansion of the deviation between the model 32 of the control system and the actual turning system 31 due to changes in the running environment conditions is suppressed, it is possible to ensure the accuracy of the turning control with respect to changes in the running environment conditions.

The change of the road reaction force coefficient $K_2$ may be performed after the deviation between the nominal model of the turning system 31 and the actual turning system 31 is expanded to some extent. Specifically, the value of the road reaction force coefficient $K_2$ may be fixed during the magnitude of the disturbance calculated by the disturbance observer 40 (i.e., the absolute value of ($\delta\_hat-\delta^*$)) is a predetermined value or less. And then, the change of the road reaction force coefficient $K_2$ ma be performed on the condition that the magnitude of the disturbance calculated by the disturbance observer 40 is the predetermined value or more. According to this, it is possible to suppress frequent changes of the road reaction force coefficient $K_2$ at the stage where the deviation between the model of the control device 4 and the actual turning system 31 is small, and to ensure the stability of the turning control.

Figure 7:
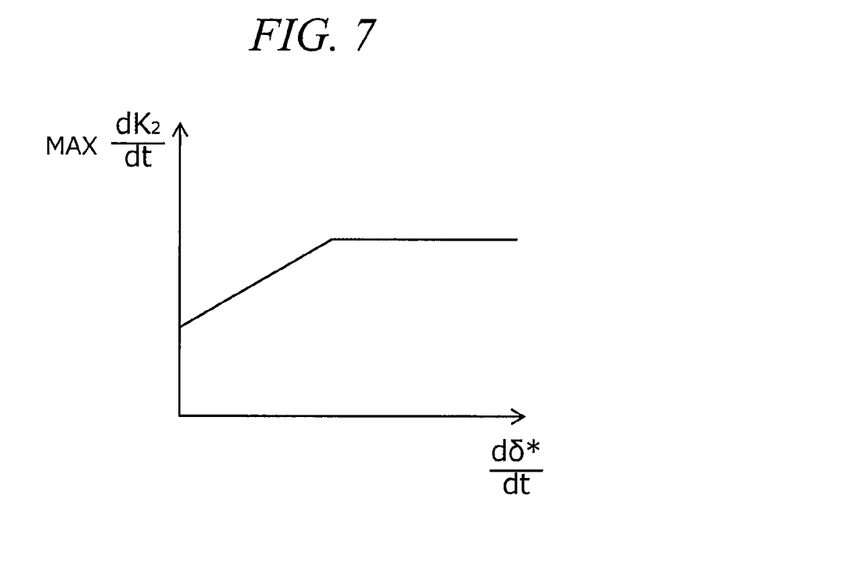
FIG. 7 is a diagram illustrating an example of setting of maximum change speed of the road reaction force coefficient $K_2$.

In addition, when the road reaction force coefficient $K_2$ is changed, the change (that is, the amount of the change per unit time) of the road reaction force coefficient $K_2$ may be limited. FIG. 7 is a diagram illustrating an example of setting maximum change speed of the road reaction force coefficient $K_2$. In the example shown in FIG. 7, the maximum change speed of the road reaction force coefficient $K_2$ is increased in accordance with an increase in the change speed of the target turning angle, but when the change speed of the target turning angle exceeds a predetermined value, the maximum change speed of the road reaction force coefficient $K_2$ is held at a constant value. In other words, the change speed of the road reaction force coefficient $K_2$ is limited below a predetermined upper limit value. By setting the limit on the change speed of the road surface reaction force coefficient $K_2$, it is possible to prevent a sudden change in vehicle behavior.

Figure 8:
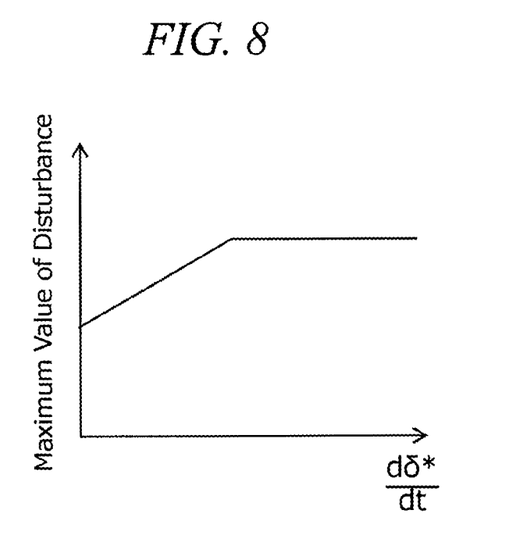
FIG. 8 is a diagram illustrating an example of setting of maximum value of disturbance.

When the vehicle is stopped or when lateral acceleration acting on the vehicle is in the saturation region, the stability is given priority over the responsiveness in the turning control, in such a case, after stopping the change of the road reaction force coefficient the magnitude of the disturbance calculated by the disturbance observer 40 (i.e., the absolute value of the deviation amount between the estimated value $\delta\_hat$ of the target turning angle and the target turning angle $\delta^*$) may be limited to a predetermined upper limit value or less, as shown in FIG. 8. By providing such restrictions, it is possible to maintain the stability in the turning control. Further, as shown in FIG. 8, when the change rate of the target turning angle is a predetermined value or less, the maximum value of the disturbance may be increased in accordance with the change speed of the target turning angle in a range that does not exceed the upper limit value.

In this embodiment, the control device 4 has the feed-forward model 32, the turning system inverse model 41, and a feed-forward inverse model 42. However, the control device 4 may be configured to have the feed-forward model 32 and the disturbance observer comprising the turning system inverse model 41, as shown in another example of FIG. 9.

Figure 9:
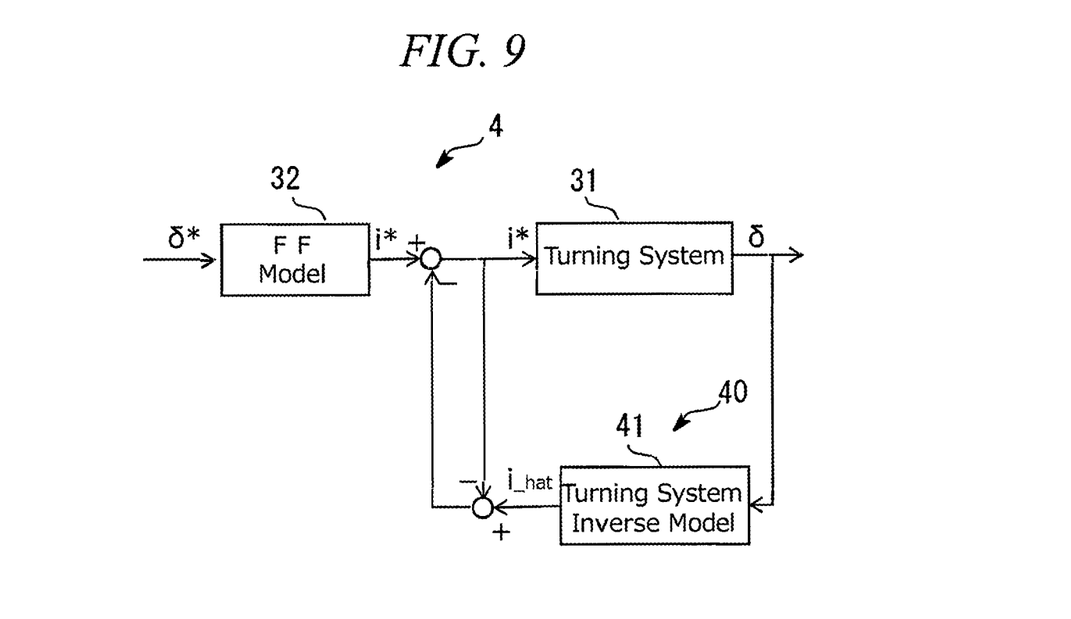
FIG. 9 is a block diagram illustrating another example of a control system of a steering system for a vehicle according to the embodiment of the present disclosure.

In the ease of a configuration of a control device of FIG. 9, in the turning system inverse model 41, estimated value $i\_hat$ of the target motor current is calculated from the turning angle $\delta$. The control device 4 calculates deviation amount ($i\_hat-i^*$) between the estimated value $i\_hat$ of the calculated target motor current and the target motor current $i^*$ as a disturbance. The value after the disturbance ($i\_hat-i^*$) is subtracted from the target motor current $i^*$ output from the feed forward model 32 is input to the turning system 31 as the target motor current $i^*$ after disturbance removal.

The deviation amount ($i\_hat-i^*$) with respect to the target motor current calculated when the control device 4 has the configuration shown in FIG. 9 can be used as a parameter for determining whether the deviation between a nominal model of the turning system 31 and the actual turning system 31 has expanded to some extent, as well as the deviation amount ($\delta\_hat-\delta^*$) with respect to the target turning angle. Specifically, the value of the road reaction force coefficient $K_2$ may be fixed during the deviation amount (i.e., disturbance) is lower than a predetermined value, and the change of the road reaction force coefficient $K_2$ may be performed on the condition that the deviation amount is the predetermined value or more.

As in the case shown in FIG. 8, the disturbance (i.e., the amount of deviation between the estimated value $i\_hat$ of the target motor current and the target motor current $i^*$ ($i\_hat-i^*$)), to be subtracted from the target motor current $i^*$, may be limited below a predetermined upper limit value. Further, as shown in FIG. 8, when the change speed of the target turning angle is less than or equal to a predetermined value, the maximum value of the disturbance may be increased in accordance with the change speed of the target turning angle in a range that does not exceed the upper limit value.

What is claimed is:

1. A steering device for a vehicle of a steer-by-wire system comprising:
a steering mechanism, which is mechanically disconnected from a steering wheel, to cause a turning wheel to be turned by a turning motor; and
a control device which provides a motor command value to the turning motor, wherein the control device includes a control system comprising:
a feed-forward model for converting a target turning angle to a feed-forward value of the motor command value, and
a disturbance observer including a reverse model of a model of the turning motor, wherein
a transfer function describing the feed-forward model and a model of the disturbance observer includes a variable coefficient, and wherein
the control device changes the variable coefficient based on information about road reaction force.

2. The steering device for a vehicle according to claim 1, wherein the control device, when disturbance calculated by the disturbance observer becomes a predetermined value or more, changes the variable coefficient based on the information about the road reaction force.

3. The steering device for a vehicle according to claim 2, wherein the control device limits change speed of the variable coefficient to a predetermined upper limit value or less.

4. The steering device for a vehicle according to claim 3, wherein the control device, when change speed of the target turning angle is a predetermined value or less, increases maximum change speed of the variable coefficient in accordance with the change speed of the target turning angle in a range that does not exceed the upper limit value.

5. The steering device for a vehicle according to claim 1, wherein the control device, when the vehicle is stopped or when lateral acceleration acting on the vehicle is in a saturation region, stops the change of the variable coefficient and limits disturbance calculated by the disturbance observer to a predetermined upper limit value or less.

6. The steering device for a vehicle according to claim 5, wherein the control device, when a change speed of the target turning angle is a predetermined value or less, increases maximum value of the disturbance in accordance with change speed of the target turning angle in a range that does not exceed the upper limit value.

* * * * *